Figure 1:
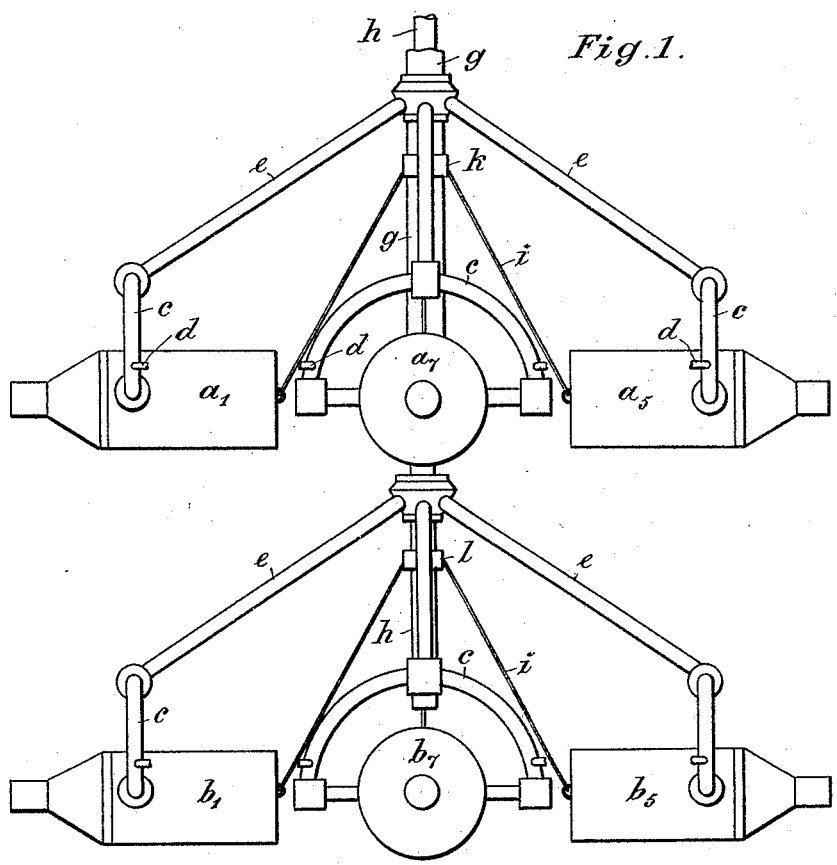

A. REICHE.
PROJECTING APPARATUS.
APPLICATION FILED MAY 26, 1921.

1,401,189.

Patented Dec. 27, 1921.

Inventor
A. Reiche,
By Markel Clark
Attys

UNITED STATES PATENT OFFICE.

ARTHUR REICHE, OF BERLIN, GERMANY, ASSIGNOR TO AKTIEBOLAGET ARS, OF STOCKHOLM, SWEDEN, A CORPORATION.

PROJECTING APPARATUS.

1,401,189. Specification of Letters Patent. Patented Dec. 27, 1921.

Application filed May 26, 1921. Serial No. 472,805.

*To all whom it may concern:*

Be it known that I, ARTHUR REICHE, subject of Germany, residing at Alt Moabit 86, Berlin, Germany, have invented certain new and useful Improvements in Projecting Apparatus, (for which I have filed an application in Germany, D. No. Sch. 58,340 IX/77g, filed May 22, 1920, in the name of Schwabe & Co.,) of which the following is a specification.

To represent movable clouds apparatuses have hitherto commonly been used consisting of cylindrical bodies inclosing the sources of light and supporting a number of projector systems, each of the cylindrical bodies being rotatable about its vertical axis to effect the horizontal movement of the cloud pictures, and the projector systems attached to the same being adapted to be inclined up and down to effect the rising and falling movement of the said pictures. It has, however, appeared that such apparatuses are connected with certain inconveniences. Thus for instance the cylindrical body possesses a comparatively small outer surface and owing thereto is incapable of conducting away completely the heat produced by all the sources of light, the said body being strongly heated when using very great lamps. Furthermore the opaque connection between the cylindrical body and the swingable projector systems requires the use of bellows of leather or the like which, especially in case of high temperatures, are liable to be easily worn out.

This invention relates to apparatus adapted for the same purpose in which the said inconveniences are prevented. The invention is characterized by the combination of a number of rigid projector apparatuses each provided with a source of light and a supporting frame adapted to rotate about a vertical axis and along the periphery of which the apparatuses are disposed radially and capable of being inclined in vertical planes. Since each casing contains only one projector lamp, it possesses a comparatively great cooling surface. Furthermore the use of bellows is avoided, since the projector system is rigidly connected with the casing.

If a very large number of projector apparatus is to be used, the supporting frame owing to the radial disposition would occupy an inconvenient bulk unsuitable to the disposal of the apparatus. In such cases the projector apparatuses are preferably divided into two or more groups disposed in the manner described above on coaxial supporting frames. By such an arrangement the apparatus of each group may be inclined simultaneously and the groups may be turned independent of each other. In the latter case the shaft of the supporting frame of one group has to inclose concentrically the shaft of the other group. Obviously such a device may be connected with other stationary or up and down swingable projector apparatus adapted to represent stationary or rising and falling clouds. Such apparatuses are preferably placed above the rotary supporting frame.

An embodiment of the invention is diagrammatically illustrated in the accompanying drawing in which—

Figure 2:
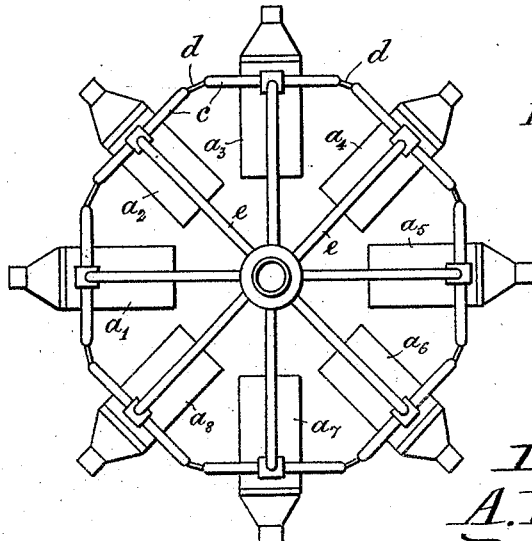

Figure 1 is a side view of an apparatus constructed according to the invention, and Fig. 2 is a plane view thereof drawn to a smaller scale.

Referring to Fig. 1, only three projector apparatus of each group comprising eight apparatuses are shown for the sake of simplicity, the intermediate apparatus being omitted. Nor are the devices for supporting and turning the two frames and for supplying the electric current illustrated. The device consists of the projector apparatus $a_1$ to $a_8$ in the upper group and $b^1$, $b^5$ and $b^7$ in the lower group. Each apparatus is journaled to a stirrup $c$. All the stirrups are interconnected by means of short cross pieces $d$, thus forming an annular body. The latter is by stays $e$ attached to the stirrups connected with the corresponding shaft, a ring supporting the upper group being connected with the outer pipe $g$ and a ring supporting the lower group with the inner pipe $h$. The rear end of each projector apparatus is by means of a wire $i$ connected with a ring $k$ and $l$ respectively, the said rings being capable by the aid of a device (not shown) to be raised and lowered on the shafts $g$ and $h$ respectively, the projector apparatus thus being swung up and down.

What I claim as new and desire to secure by Letters Patent of the United States is:—

1. A projecting apparatus for exhibiting imitation clouds movable in various directions comprising a rotatable member, a series of projecting devices radially arranged around the axis of the rotatable member and movable around said axis, and means for moving said devices about horizontal axes.

2. A projecting apparatus including a rotatable shaft, arms projecting outwardly from said shaft, a series of projecting devices radially arranged relatively to said shaft and supported by said arms, and means for moving said projecting devices about horizontal axes.

3. A projecting apparatus including a rotatable shaft, a plurality of arms extending outwardly from said shaft, a stirrup carried by the outer end of each of said arms, a projecting device supported in each of said stirrups and movable about a horizontal axis, and means for moving each of said projecting devices about its horizontal axis.

4. A projecting apparatus including a rotatable shaft, arms extending outwardly from said shaft and rotatable therewith, a projecting device pivotally mounted adjacent the outer end of each of said arms and movable about its horizontal axis, a collar slidably mounted on said shaft and means connecting said collar with said projecting devices, whereby the movement of said collar will cause said projecting devices to move about their horizontal axes.

5. A projecting apparatus including a plurality of concentrically arranged rotatable shafts, a series of radially extending arms fixed to each of said shafts, a stirrup arranged at the outer end of each of said arms, a projecting device pivotally mounted in each of said stirrups and movable about a horizontal axis, collars slidably mounted on said shafts, and means connecting said collars to said projecting devices, whereby movement of said collars will cause movement of the projecting devices about their horizontal axes.

In testimony whereof I affix my signature in presence of two witnesses.

ARTHUR REICHE.

Witnesses:
 CORP HERNFZ,
 ERNST UHLIG.